United States Patent
Tsubouchi

(10) Patent No.: US 11,011,761 B2
(45) Date of Patent: May 18, 2021

(54) FUEL CELL SYSTEM

(71) Applicant: TOYOTA JIDOSHA KABUSHIKI KAISHA, Toyota (JP)

(72) Inventor: Masakatsu Tsubouchi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 268 days.

(21) Appl. No.: 16/274,349

(22) Filed: Feb. 13, 2019

(65) Prior Publication Data
US 2019/0312288 A1    Oct. 10, 2019

(30) Foreign Application Priority Data
Apr. 6, 2018 (JP) .............................. JP2018-074235

(51) Int. Cl.
| | |
|---|---|
| H01M 8/04029 | (2016.01) |
| H01M 8/0267 | (2016.01) |
| H01M 8/04089 | (2016.01) |
| H01M 8/04701 | (2016.01) |
| H01M 8/04746 | (2016.01) |
| H01M 8/24 | (2016.01) |
| H01M 8/0656 | (2016.01) |

(52) U.S. Cl.
CPC ..... *H01M 8/04029* (2013.01); *H01M 8/0267* (2013.01); *H01M 8/04089* (2013.01); *H01M 8/04708* (2013.01); *H01M 8/04753* (2013.01); *H01M 8/0656* (2013.01); *H01M 8/24* (2013.01); *H01M 2250/20* (2013.01)

(58) Field of Classification Search
CPC ...................... H01M 8/04753; H01M 8/04089
See application file for complete search history.

(56) References Cited

U.S. PATENT DOCUMENTS

| | | | |
|---|---|---|---|
| 2011/0053023 A1* | 3/2011 | Johansen | H01M 8/04753 429/429 |
| 2012/0083387 A1* | 4/2012 | Turner | F02C 6/10 477/5 |
| 2016/0365590 A1* | 12/2016 | Zheng | H01M 8/06 |

FOREIGN PATENT DOCUMENTS

| | | | |
|---|---|---|---|
| CN | 107086319 | * | 8/2017 |
| JP | 2003-217641 | | 7/2003 |
| JP | 2006-073404 | | 3/2006 |

* cited by examiner

*Primary Examiner* — Jonathan Crepeau
(74) *Attorney, Agent, or Firm* — Oblon, McClelland, Maier & Neustadt, L.L.P.

(57) ABSTRACT

A fuel cell system includes: a fuel cell stack of fuel cells that generate electricity by electrochemical reaction between hydrogen that is a fuel gas and oxygen that is an oxidant gas; an expander that is provided on a supply path of the fuel gas to the fuel cell stack, and at which, due to the fuel gas that is in a high-pressure state being supplied thereto, the fuel gas is expanded and the pressure thereof is reduced, and, due to the fuel gas being expanded and the pressure thereof being reduced, internal energy of the fuel gas is converted into mechanical energy; and a heating device that is provided further toward an upstream side of the supply path than the expander, and that heats the fuel gas.

5 Claims, 4 Drawing Sheets

FUEL CELL SYSTEM

CROSS-REFERENCE TO RELATED APPLICATION

This application is based on and claims priority under 35 USC 119 from Japanese Patent Application No. 2018-074235 filed on Apr. 6, 2018, the disclosure of which is incorporated by reference herein.

BACKGROUND

Technical Field

The present disclosure relates to a fuel cell system.

Related Art

Japanese Patent Application Laid-Open (JP-A) No. 2003-217641 discloses a structure that, at the time when fuel gas, which contains hydrogen and is supplied to a fuel cell stack, is adiabatically expanded at an expander, converts the internal energy of the fuel gas into mechanical energy, and utilizes the mechanical energy. In such a structure, the greater the internal energy of the fuel gas, the greater the mechanical energy that can be obtained.

SUMMARY

A fuel cell system of an aspect of the present disclosure includes: a fuel cell stack of fuel cells that generate electricity by electrochemical reaction between hydrogen that is a fuel gas and oxygen that is an oxidant gas; an expander that is provided on a supply path of the fuel gas to the fuel cell stack, and at which, due to the fuel gas that is in a high-pressure state being supplied thereto, the fuel gas is expanded and the pressure thereof is reduced, and, due to the fuel gas being expanded and the pressure thereof being reduced, internal energy of the fuel gas is converted into mechanical energy; and a heating device that is provided further toward an upstream side of the supply path than the expander, and that heats the fuel gas.

BRIEF DESCRIPTION OF DRAWINGS

Exemplary embodiments of the present disclosure will be described in detail based on the following figures, wherein.

DETAILED DESCRIPTION

Figure 1:
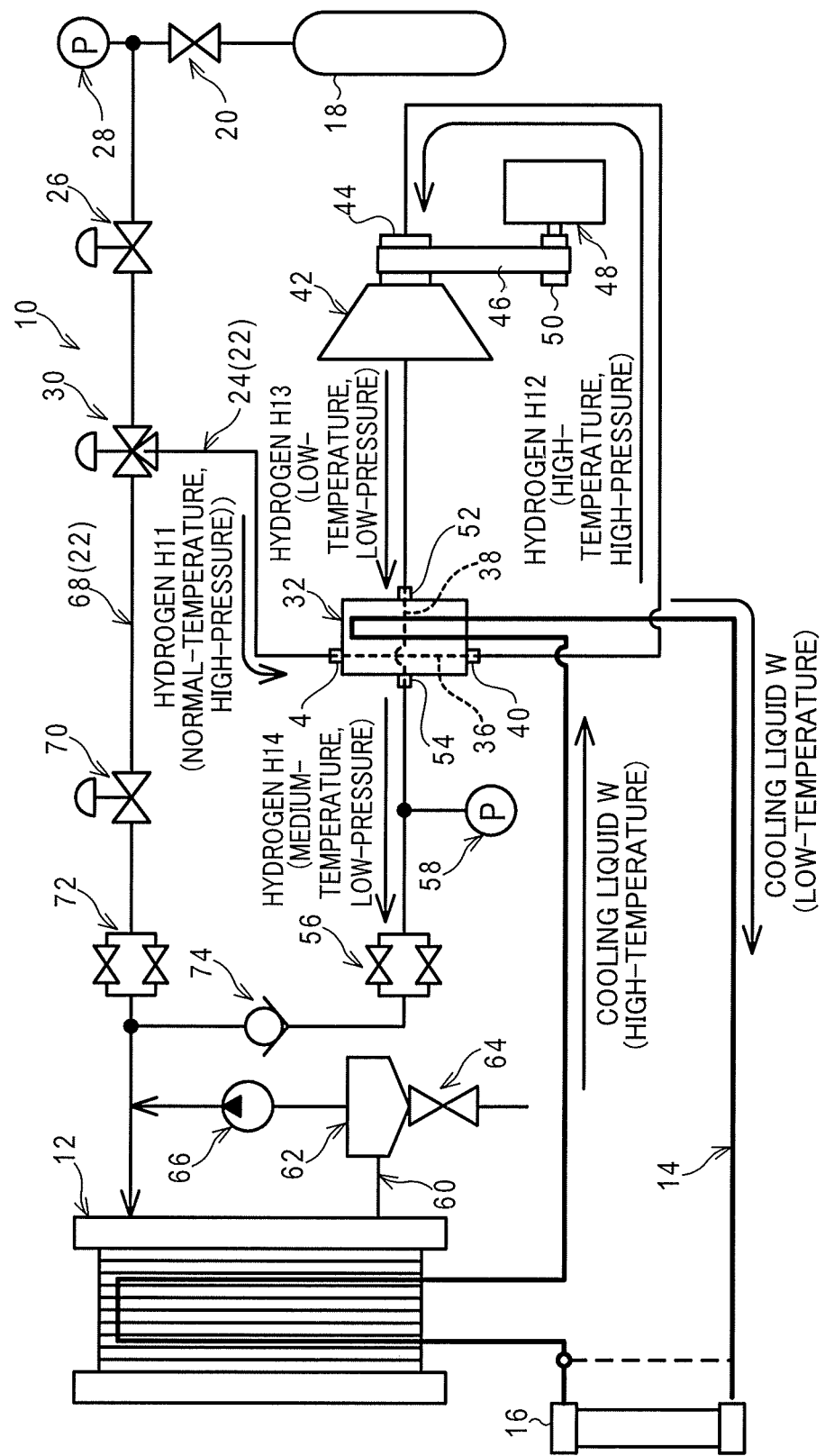
FIG. 1 is a circuit diagram of hydrogen, cooling liquid, and the like, that shows the structure of a fuel cell system relating to a first embodiment.

Respective embodiments of the present disclosure are described next on the basis of the respective drawings of FIG. 1 through FIG. 4. Note that a fuel cell system 10 that is described hereinafter and relates to the respective embodiments is a structure that is installed in a vehicle. However, the left-right direction in the drawings, the top-bottom direction in the drawings, and the like in the respective drawings basically have no relation to the respective directions that are based on the vehicle, such as the vehicle longitudinal direction, the vehicle transverse direction, and the like.

Structure of First Embodiment

As shown in FIG. 1, the fuel cell system 10 relating to the present embodiment has a fuel cell stack 12 that structures a fuel cell. The fuel cell stack 12 has plural cells. Hydrogen that serves as a fuel gas flows between the positive electrodes (anodes, fuel electrodes) of the cells and the separators at the positive electrode sides, and air that contains oxygen that serves as an oxidant flows between the negative electrodes (cathodes, air electrodes) of the cells and the separators at the negative electrode sides. Due thereto, an electrochemical reaction occurs, and electricity is generated thereby.

The fuel cell stack 12 is electrically connected via a driving driver, which is installed in the vehicle, to a vehicle driving motor that serves as a driving device. The vehicle driving motor is driven due to electric power being supplied from the fuel cell stack 12 to the vehicle driving motor. The output shaft of the vehicle driving motor is mechanically connected to the driving wheels of the vehicle. The vehicle can travel due to the driving force of the vehicle driving motor being transmitted to the driving wheels.

Further, a cooling liquid flow path 14 is disposed in a vicinity of the cells of the fuel cell stack 12. A fluid or a cooling liquid which serves as a coolant flows through the cooling liquid flow path 14. The cooling liquid is formed by, for example, additives such as an antifreezing agent, a preservative, or the like being added to water. The electrochemical reaction between hydrogen and oxygen at the cells of the fuel cell stack 12 is accompanied by the generation of heat, and the cells are cooled due to heat being exchanged between the cells and the cooling liquid at the time when the cooling liquid passes by a vicinity of the cells of the fuel cell stack 12.

The both ends of this cooling liquid flow path 14 are connected to a radiator 16 that serves as a first heat exchanger, and the cooling liquid flows through the radiator 16. The radiator 16 is disposed, for example, within the engine room of the vehicle and at the vehicle rear side of a radiator grill. When the vehicle travels, cooling wind passes through the radiator grill, and enters into the engine room. The traveling wind, which has entered into the engine room in this way, passes through the radiator 16. The cooling liquid is cooled due to heat being exchanged between the traveling wind and the cooling liquid that passes through the radiator 16, at the time when the traveling wind passes through the radiator 16.

On the other hand, the present fuel cell system 10 has a tank 18. Hydrogen, which serves as the above-described fuel gas, is stored in the tank 18 in a high-pressure state. A gate valve 20 is provided at, for example, the mouthpiece portion of the tank 18. One end of a main flow path 24, which structures a fuel gas flow path 22 that serves as a supply path, is connected to the discharge port of the gate valve 20. The other end of the main flow path 24 is connected to the supply port at the positive electrode side of the fuel cell stack 12. The tank 18 is connected to the fuel cell stack 12 via the gate valve 20 and the main flow path 24.

A first pressure-adjusting valve 26 is provided at the intermediate portion of the main flow path 24. The supply port of the first pressure-adjusting valve 26 is connected to the discharge port of the gate valve 20 via the main flow path 24. The first pressure-adjusting valve 26 is structured by, for example, a pressure reducing valve. The pressure of the hydrogen which is further toward the main flow path 24 downstream side than the first pressure-adjusting valve 26 (i.e., the hydrogen that flows-out from the discharge port of the first pressure-adjusting valve 26) is maintained constant by the first pressure-adjusting valve 26. Further, a first pressure sensor 28 is connected to the main flow path 24 between the supply port of the first pressure-adjusting valve 26 and the discharge port of the gate valve 20. For example, the pressure of the hydrogen within the tank 18, or the like, is detected by the first pressure sensor 28.

On the other hand, the discharge port of the first pressure-adjusting valve 26 is connected to the supply port of a switching valve 30 by the main flow path 24. The switching valve 30 is a three-way valve that has a supply port, a first discharge port and a second discharge port. By adjusting the degree of opening of the switching valve 30, the flow rate of the hydrogen that flows between the supply port and the first discharge port, and the flow rate of the hydrogen that flows between the supply port and the second discharge port, can be adjusted.

The first discharge port of the switching valve 30 is connected, by the main flow path 24, to a first supply port 34 of a second heat exchanger 32 that serves as a heat exchanger. The second heat exchanger 32 has a first heat exchanger flow path 36 and a second heat exchanger flow path 38. One end of the first heat exchanger flow path 36 is connected to the first supply port 34 of the second heat exchanger 32. The other end of the first heat exchanger flow path 36 is connected to a first discharge port 40 of the second heat exchanger 32.

The hydrogen, which flows from the first discharge port of the switching valve 30 via the main flow path 24 to the first supply port of the second heat exchanger 32, flows through the first heat exchanger flow path 36 of the second heat exchanger 32, and further, flows to the first discharge port of the second heat exchanger 32. Further, the second heat exchanger 32 is provided on the above-described cooling liquid flow path 14, at further toward the downstream side than the fuel cell stack 12 and further toward the upstream side than the radiator 16. At the second heat exchanger 32, heat exchange is carried out between the hydrogen, which flows through the first heat exchanger flow path 36 of the second heat exchanger 32, and the cooling liquid that flows through the cooling liquid flow path 14.

The first discharge port 40 of the second heat exchanger 32 is connected to the supply port of an expander 42 by the main flow path 24. The hydrogen, which has flowed through the first heat exchanger flow path 36 of the second heat exchanger 32, flows through the main flow path 24 and is supplied to the expander 42. The hydrogen that is supplied to the expander 42 is, at the expander 42, adiabatically expanded and the pressure thereof is reduced. The expander 42 has an output shaft 44. The internal energy of the hydrogen in the process of the adiabatic expansion of the hydrogen at the expander 42 is used in rotating the output shaft 44. Due thereto, the temperature of the hydrogen falls in the process of the adiabatic expansion.

The output shaft 44 of the expander 42 is mechanically connected, via a timing belt 46 that is one form of a rotational force transmitting mechanism, to an input shaft 50 of a machine device 48. The rotational force of the output shaft 44 of the expander 42 is transmitted via the timing belt 46 to the input shaft 50 of the machine device 48. The machine device 48 is operated due to the rotational force of the output shaft 44 of the expander 42 being transmitted to the input shaft 50 of the machine device 48. (Namely, the machine device 48 is operated by using, as the motive force thereof, the rotational force of the output shaft 44 of the expander 42.) This machine device 48 is, for example, a fan for causing traveling wind and the like to efficiently flow to the above-described radiator 16. However, the machine device 48 may be a power generator, a compressor that compresses a fluid such as air or the like, or the like. Provided that the machine device 48 is a structure that is operated due to rotational force being inputted thereto, the machine device 48 is not limited to the fan of the radiator 16, and any of various structures can be used therefor.

On the other hand, the discharge port of the expander 42 is connected by the main flow path 24 to a second supply port 52 of the second heat exchanger 32. One end of the second heat exchanger flow path 38 of the second heat exchanger 32 is connected to the second supply port 52 of the second heat exchanger 32. The other end of the second heat exchanger flow path 38 is connected to a second discharge port 54 of the second heat exchanger 32. At the second heat exchanger 32, heat exchange is carried out between the hydrogen, which flows through the second heat exchanger flow path 38 of the second heat exchanger 32, and the cooling liquid that flows through the cooling liquid flow path 14.

The second discharge port 54 of the second heat exchanger 32 is connected to a first injector 56. The first injector 56 is connected by the main flow path 24 to the supply port at the positive electrode side of the fuel cell stack 12. The hydrogen, which is discharged from the second discharge port 54 of the second heat exchanger 32, flows through the first injector 56, and flows to the supply port at the positive electrode side of the fuel cell stack 12, and flows to between the positive electrodes (the anodes, fuel electrodes) of the cells of the fuel cell stack 12 and the separators that are at the positive electrode side. Further, a second pressure sensor 58 is provided on the main flow path 24 between the second heat exchanger 32 and the first injector 56. The pressure or the like of the hydrogen that is discharged from the second discharge port 54 of the second heat exchanger 32 is detected by the second pressure sensor 58.

On the other hand, the discharge port at the positive electrode side of the fuel cell stack 12 is connected to one end of an exhaust flow path 60. The other end of the exhaust flow path 60 is connected to the main flow path 24, between the first injector 56 and the portion that is connected to the supply port at the positive electrode side of the fuel cell stack 12. A gas-liquid separator 62 is provided at the intermediate portion of the exhaust flow path 60. The exhaust, which is discharged from the discharge port at the positive electrode side of the fuel cell stack 12, flows to the gas-liquid separator 62.

The liquid discharge port of the gas-liquid separator 62 is connected to a drain valve 64. The moisture, which is contained in the exhaust from the discharge port at the positive electrode side of the fuel cell stack 12, is discharged-out from the drain valve 64. In contrast, the gas discharge port of the gas-liquid separator 62 is connected to a pump 66 by the exhaust flow path 60. Further, the pump 66 is connected by the exhaust flow path 60 to the main flow path 24, between the first injector 56 and the supply port at the positive electrode side of the fuel cell stack 12. The exhaust from which moisture has been separated at the gas-liquid separator 62, is made to flow by the pump 66 toward the supply port at the positive electrode side of the fuel cell stack 12. Further, the hydrogen from the first injector 56 is merged-together with the exhaust that is made to flow toward the supply port at the positive electrode side of the fuel cell stack 12 by the pump 66, and, due thereto, hydrogen is made to flow, together with the exhaust, to the supply port at the positive electrode side of the fuel cell stack 12.

Further, the fuel gas flow path 22 has a bypass flow path 68. One end of the bypass flow path 68 is connected to the second discharge port of the switching valve 30. A second pressure-adjusting valve 70 is provided on the bypass flow path 68. The second pressure-adjusting valve 70 is structured by a pressure-reducing valve for example. The pressure of the hydrogen that is further toward the downstream side of the bypass flow path 68 than the second pressure-adjusting valve 70 (i.e., the hydrogen that flows-out from the discharge port of the second pressure-adjusting valve 70) is maintained constant by the second pressure-adjusting valve 70.

A second injector 72 is provided further toward the downstream side than the second pressure-adjusting valve 70 of the bypass flow path 68. The discharge port of the second pressure-adjusting valve 70 is connected to the second injector 72 by the bypass flow path 68. The portion of the bypass flow path 68, which is further toward the other end side than the second injector 72, is connected to the merging portion of the first injector 56 of the main flow path 24 and the exhaust flow path 60 of the main flow path 24. The hydrogen, which has flowed-out from the discharge port of the second pressure-adjusting valve 70, passes through the second injector 72, and flows to the supply port at the positive electrode side of the fuel cell stack 12. Further, a check valve 74 is provided on the main flow path 24 between the first injector 56 and the portion of the main flow path 24 that merges with the bypass flow path 68. The hydrogen, which flows through the second injector 72 of the bypass flow path 68, is prevented from flowing toward the first injector 56 side of the main flow path 24.

Operation, Effects of First Embodiment

Operation and effects of the first embodiment are described next.

In the present fuel cell system 10, when the portion between the supply port and the second discharge port of the switching valve 30 (i.e., the bypass flow path 68 side) is closed, and the portion between the supply port and the first discharge port of the switching valve 30 is opened, hydrogen of a flow rate corresponding to the degree of opening of the switching valve 30 flows through the main flow path 24 of the fuel gas flow path 22. The hydrogen that flows from the first discharge port of the switching valve 30 is supplied to the expander 42, and, at the expander 42, the hydrogen is adiabatically expanded and the pressure thereof reduced. Moreover, in the process of the adiabatic expansion of the hydrogen at the expander 42, the internal energy of the hydrogen is used in rotating the output shaft 44. Due thereto, the temperature of the hydrogen falls in the process of the adiabatic expansion.

The hydrogen that has flowed-out from the expander 42 flows, via the second heat exchanger flow path 38 of the second heat exchanger 32 and the first injector 56, to the supply port at the positive electrode side of the fuel cell stack 12, and flows to between the positive electrodes of the cells of the fuel cell stack 12 and the separators that are at the positive electrode side. In this state, when air flows between the negative electrodes of the cells and the separators that are at the negative electrode side, an electrochemical reaction occurs between the hydrogen and the oxygen that is contained in the air, and electricity is generated thereby. The electric power that is generated at the fuel cell stack 12 in this way is supplied via the driving driver, which is installed in the vehicle, to the vehicle driving motor that serves as the driving device. Due thereto, the vehicle driving motor is driven, and the driving wheels of the vehicle are rotated. Due thereto, the vehicle can travel.

By the way, as shown in FIG. 1, at the present fuel cell system 10, hydrogen H11, which has been released from the tank 18 and has flowed through the gate valve 20, the first pressure-adjusting valve 26 and the first discharge port of the switching valve 30 and that is normal-temperature and high-pressure, flows from the first supply port 34 of the second heat exchanger 32 to the first heat exchanger flow path 36. On the other hand, the cooling liquid flow path 14 is provided at the second heat exchanger 32. Cooling liquid W, which has become high-temperature due to the heat exchange at the fuel cell stack 12, flows through the second heat exchanger 32. Therefore, at the second heat exchanger 32, heat is exchanged between the hydrogen H11 that is normal-temperature and high-pressure and the cooling liquid W that has become high-temperature. (Namely, the hydrogen H11 is heated by the high-temperature cooling liquid W, and the cooling liquid W is cooled by the normal-temperature hydrogen H11.) Due thereto, the hydrogen H11 becomes hydrogen H12 that is high-temperature and high-pressure, and is discharged-out from the first discharge port 40 of the second heat exchanger 32.

The hydrogen H12, which is discharged-out from the first discharge port 40 of the second heat exchanger 32, flows through the main flow path 24 and is supplied to the expander 42 from the supply port of the expander 42. The high-temperature, high-pressure hydrogen H12 that has been supplied to the expander 42 is adiabatically expanded at the expander 42. Due thereto, the hydrogen 12 is expanded and, together therewith, the pressure thereof is decreased (i.e., the volume of the hydrogen H12 is increased, and, together therewith, the pressure of the hydrogen H12 is decreased). Moreover, in the process of the expansion and pressure reduction of the hydrogen H12, at least some of the internal energy of the hydrogen H12 is used in rotating the output shaft 44. The rotational force of the output shaft 44 is transmitted by the timing belt 46 to the input shaft 50 of the machine device 48, and the machine device 48 is operated due to the input shaft 50 being rotated.

In this way, due to the internal energy of the hydrogen H12 being used in rotating the output shaft 44 in the process of the adiabatic expansion of the hydrogen H12 at the expander 42, the temperature of the hydrogen H12 falls, and the hydrogen H12 becomes hydrogen H13 that is low-temperature and low-pressure. This low-temperature, low-pressure hydrogen H13 flows from the second supply port 52 of the second heat exchanger 32 to the second heat exchanger flow path 38. Due thereto, at the second heat exchanger 32, heat is exchanged between the low-temperature, low-pressure hydrogen H13 and the high-temperature cooling liquid W. (Namely, the cooling liquid W is cooled by the low-temperature hydrogen H13, and the hydrogen H13 is heated by the high-temperature cooling liquid W). Due thereto, the hydrogen H13 becomes hydrogen H14 which is medium-temperature and low-pressure, and is discharged-out from the second discharge port 54 of the second heat exchanger 32, and flows to the support port side of the fuel cell stack 12.

By the way, when, in an open system, a gas works at the exterior of the system, the internal energy of the gas decreases. This is generally known in accordance with the first law of thermodynamics and the like. In the case of adiabatic expansion, due to the reduction in the internal energy, the pressure of the gas decreases, and the volume of the gas increases. The amount of decrease in the internal energy corresponds to the integrated value of the products of the pressure and the volume from the time of the start of volumetric expansion of the gas until the time of the end of the volumetric expansion. Here, if the pressure of the gas at the time of the end of the volumetric expansion is the same, the amount of decrease in the internal energy, i.e., the magnitude of the work that the gas does at the exterior in an open system, can be increased by making higher the pressure at the time of the start of the volumetric expansion of the gas.

On the other hand, generally, the product of the pressure and volume of a gas is approximately proportional to the temperature of the gas. This is generally known in accordance with the equation of state of a gas and the like. Accordingly, the work, which a gas does at the exterior of a system in a state in which the gas is heated and the temperature of the gas has become high, can be made to be greater than the work that a gas, which has not been heated, does at the exterior of the system.

Here, in the present embodiment, the normal-temperature, high-pressure hydrogen H11 is heated at the second heat exchanger 32 and becomes the high-temperature, high-pressure hydrogen H12 and is supplied to the expander 42. Therefore, the internal energy of the hydrogen H12 that is used in rotating the output shaft 44 of the expander 42 can be increased. Due thereto, for example, the number of revolutions of the output shaft 44 of the expander 42 can be improved.

Comparison of First Embodiment and Comparative Example

Figure 2:
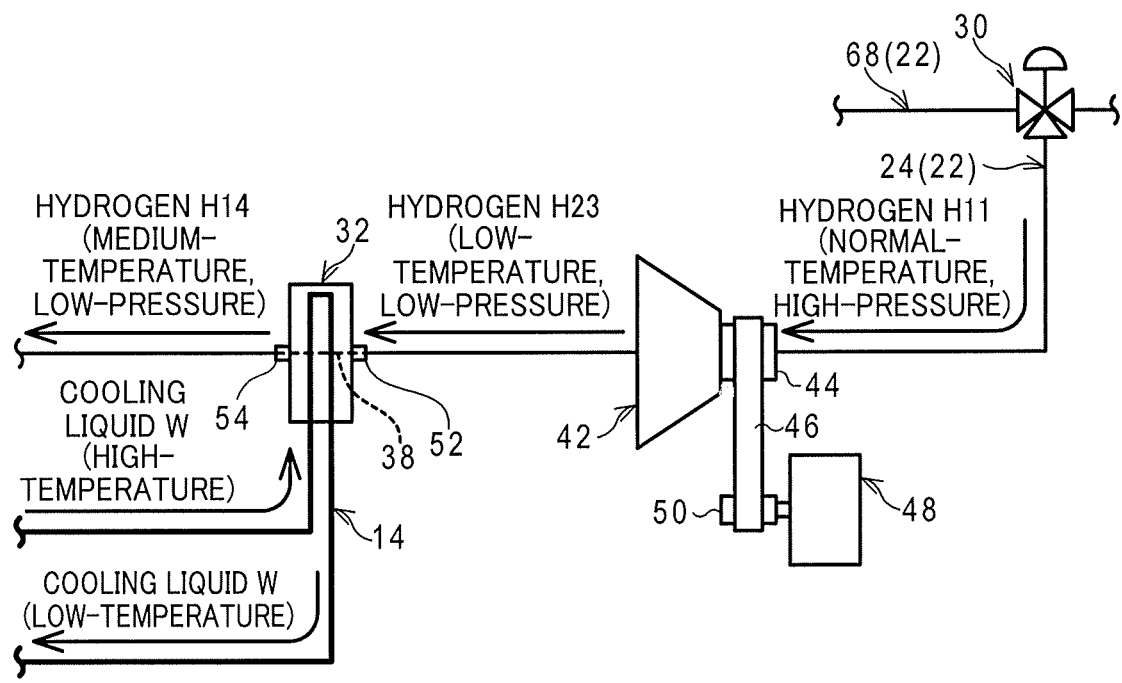
FIG. 2 is a circuit diagram of hydrogen, cooling liquid and the like, that shows main portions of the structure of a fuel cell system of a comparative example that is for comparison with the first embodiment.

Next, the present embodiment and a comparative example that is illustrated in FIG. 2 are compared.

In the comparative example that is shown in FIG. 2, the first discharge port of the switching valve 30 is connected to the supply port of the expander 42 by the main flow path 24. In this comparative example, the second heat exchanger 32 is provided on the main flow path 24, between the first discharge port of the switching valve 30 and the supply port of the expander 42. Therefore, the hydrogen H11, which flows to the supply port of the expander 42, is not heated by the second heat exchanger 32 and the like, and the hydrogen H11 is supplied, as is at normal temperature and high pressure, to the supply port of the expander 42.

Temperature T and pressure P respectively of hydrogen H11 through H14 and hydrogen H23 of the comparative example and the first embodiment are shown in following Table 1. (The numbers of the respective hydrogen H11 through H23 are appended to letter "T" for temperature and letter "P" for pressure.)

TABLE 1

|  | hydrogen H11 | hydrogen H12 | hydrogen H13 | hydrogen H14 | hydrogen H23 |
| --- | --- | --- | --- | --- | --- |
| temperature T | T11 | T12 | T13 | T14 | T23 |
| pressure P | P11 | P12 | P13 | P14 | P23 |

Further, the temperature of the high-temperature cooling liquid W before passing through the second heat exchanger 32 is T01, and the temperature of the low-temperature cooling liquid W after having passed through the second heat exchanger 32 is T02. However, in a system for cooling the fuel cell stack 12, which is used in the fuel cell system 10 and which includes the radiator 16, because the flow rate of the cooling liquid W is high (the flow velocity is fast), the temperature gradient of the cooling liquid W is small, and the difference between temperature T01 and temperature T02 is assumed to be small (i.e., temperature T01≈temperature T02).

Moreover, in the following formulas, κ is the ratio of specific heat of hydrogen, m is the mass flow rate of hydrogen, and Cv is the specific heat at constant volume of hydrogen. Further, as described above, temperature T01 temperature T02, and moreover, as will be described later, due to the hydrogen H11 flowing through the first heat exchanger flow path 36 of the second heat exchanger 32, heat is exchanged between the hydrogen H11 and the high-temperature cooling liquid W, and, assuming that the hydrogen H11 is heated until temperature T11 of the hydrogen H11 is approximately the same temperature as the temperature T01 of the high-temperature cooling liquid W, temperature T12 of the hydrogen H12 after having flowed through the second heat exchanger 32 becomes approximately equal to the temperature T01 of the high-temperature cooling liquid W (i.e., temperature T12 temperature T01). Accordingly, for convenience, temperature effectiveness η at the second heat exchanger 32 can be assumed to be 1. Moreover, Cr is the pressure ratio of the expander 42, and the expanders 42 that have the same pressure ratios are used in the comparative example and the first embodiment. Therefore, the pressure ratio Cr of the expander 42 is Cr=(P23/P11)=(P13/P12).

Considered first is a cold heat amount Qa at the temperature difference between temperature T23 of the hydrogen 23 before passing through the second heat exchanger 32 and temperature T14 of the hydrogen H14 after having flowed through the second heat exchanger 32, in the structure of the comparative example. Due to the hydrogen H23 flowing through the second heat exchanger 32, heat is exchanged between the hydrogen H23 and the high-temperature cooling liquid W, and, assuming that the hydrogen H23 is heated to a temperature at which the temperature T23 of the hydrogen H23 is approximately the same temperature as the temperature T01 of the high-temperature cooling liquid W, the temperature T14 of the hydrogen H14 after having flowed through the second heat exchanger 32 becomes approximately equal to the temperature T01 of the high-temperature cooling liquid W. Accordingly, the cold heat amount Qa is expressed as following formula 1.

$$Qa = -m \cdot Cv \cdot (T01 - T23) = -\alpha \cdot (T01 - T23)$$

$$\alpha = m \cdot Cv \quad (1)$$

Here, the temperature T23 is expressed by following formula 2, when the pressure ratio Cr of the expander 42 is used. Accordingly, from above formula 1 and formula 2, the cold heat amount Qa is expressed by following formula 3.

$$T23 = Cr^{\left(\frac{\kappa-1}{\kappa}\right)} \cdot T11 = Cr^{\beta} \cdot T11 \quad (2)$$

$$\beta = \frac{\kappa-1}{\kappa} < 1, Cr < 1$$

$$Qa = -\alpha \cdot (T01 - Cr^{\beta} \cdot T11) \quad (3)$$

On the other hand, there is considered a cold heat amount Q1 at the temperature difference between the temperature T11 of the hydrogen H11 before flowing through the first heat exchanger flow path 36 of the second heat exchanger 32 and the temperature T12 of the hydrogen H12 after having flowed through the first heat exchanger flow path 36 of the second heat exchanger 32, in the structure of the first embodiment. Due to the hydrogen H11 flowing through the first heat exchanger flow path 36 of the second heat exchanger 32, heat is exchanged between the hydrogen H11 and the high-temperature cooling liquid W, and, assuming that the hydrogen H11 is heated to a temperature at which the temperature T11 of the hydrogen H11 is approximately the same as the temperature T01 of the high-temperature cooling liquid W, the temperature T12 of the hydrogen H12 after having flowed through the second heat exchanger 32 becomes approximately equal to the temperature T01 of the high-temperature cooling liquid W. Accordingly, the cold heat amount Q1 is expressed as following formula 4.

$$Q1 = -m \cdot Cv \cdot (T01 - T11) = -\alpha \cdot (T01 - T11) \quad (4)$$

Further, there is considered a cold heat amount Q2 at the temperature difference between temperature T13 of the hydrogen H13 before flowing through the second heat exchanger flow path 38 of the second heat exchanger 32 and the temperature T14 of the hydrogen H14 after having flowed through the second heat exchanger flow path 38 of the second heat exchanger 32, in the structure of the first embodiment. In the same way as the above-described cold heat amount Q1, the cold heat amount Q2 is expressed by following formula 5.

$$Q2 = -m \cdot Cv \cdot (T01 - T13) = -\alpha \cdot (T01 - T13) \quad (5)$$

Here, the temperature T13 is expressed by following formula 6, when the pressure ratio Cr of the expander 42 is used. Accordingly, from above formula 5 and formula 6, the cold heat amount Q2 is expressed by following formula 7.

$$T13 = Cr^\beta \cdot T12 \approx Cr^\beta \cdot T01 \quad (6)$$

$$T13 \approx T01, \beta = \frac{\kappa - 1}{\kappa} < 1, Cr < 1$$

$$Q2 = -\alpha \cdot (T01 - Cr^\beta \cdot T01) \quad (7)$$

Accordingly, cold heat amount Qb, which is the sum of cold heat amount Q1 and cold heat amount Q2, is as per following formula 8. Moreover, difference ΔQ between the cold heat amount Qb and the above-described cold heat amount Qa is as per formula 9.

$$Qb = Q1 + Q2 = -\alpha \cdot (T01 - T11) - \alpha \cdot (T01 - Cr^\beta \cdot T01) = \quad (8)$$
$$-\alpha \cdot (2 \cdot T01 - Cr^\beta \cdot T01 - T11)$$

$$\Delta Q = Qb - Qa = \quad (9)$$
$$-\alpha \cdot (2 \cdot T01 - Cr^\beta \cdot T01 - T11) - \{-\alpha \cdot (T01 - Cr^\beta \cdot T11)\} =$$
$$-\alpha \cdot T01 + Cr^\beta \cdot \alpha \cdot T01 - \alpha \cdot T11 - Cr^\beta \cdot \alpha \cdot T11 =$$
$$-\alpha \cdot (T01 - T11) \cdot (1 - Cr^\beta) < 0 \because \alpha > 0,$$
$$(T01 - T11) > 0, (1 - Cr^\beta) > 0$$

In this way, because ΔQ is negative, Qb is smaller than Qa. (As cold heat amounts, the cold heat amount Qb is greater than the cold heat amount Qa.) Therefore, even if the change in temperature of the cooling liquid W, at the time when the high-temperature cooling liquid W passes through the second heat exchanger 32 and becomes the low-temperature cooling liquid W, is extremely small and even if the assumption that the temperature effectiveness η of the second heat exchanger 32 can be considered to be 1 is realistic, the cold heat amount Qb does not become lower than the cold heat amount Qa (above-described ΔQ becoming positive, and Qb becoming greater than Qa, do not occur).

On the basis of these effects, expansion work Wa at the expander 42 in the comparative example and expansion work Wb at the expander 42 in the first embodiment are considered. The expansion work Wa is as per following formula 10, and the expansion work Wb is as per following formula 11. Note that n in following formula 10 and formula 11 is the amount of substance, and R is the molar gas constant.

$$Wa = P11 \cdot V11 \cdot \frac{\left(\frac{P23}{P11}\right)^{(\beta-1)}}{\beta} = n \cdot R \cdot T11 \cdot \frac{Cr^{(\beta-1)}}{\beta} \quad (10)$$

$$Wb = P12 \cdot V12 \cdot \frac{\left(\frac{P23}{P11}\right)^{(\beta-1)}}{\beta} = n \cdot R \cdot T01 \cdot \frac{Cr^{(\beta-1)}}{\beta} \quad (11)$$

$$T12 \approx T01$$

Here, in the first embodiment, the temperature T12 of the hydrogen H12 that flows from the second heat exchanger 32 to the expander 42 is approximately equal to the temperature T01 of the cooling liquid W. This temperature T01 of the cooling liquid W is higher than the temperature T11 of the hydrogen H11 that flows from the tank 18 via the gate valve 20, the first pressure-adjusting valve 26 and the switching valve 30 to the second heat exchanger 32. Therefore, the expansion work Wb at the expander 42 in the first embodiment is greater than the expansion work Wa at the expander 42 in the comparative example.

In this way, in the first embodiment, hydrogen is heated by the second heat exchanger 32, and, due thereto, the hydrogen whose temperature has become high is supplied to the expander 42. Therefore, in the first embodiment, the mechanical energy that is obtained due to hydrogen being expanded at the expander 42 (i.e., the energy for rotating the output shaft 44 of the expander 42) can be made to be large as compared with a structure in which hydrogen is supplied to the expander 42 without being heated (i.e., a structure such as that of the comparative example).

Further, as described above, the cold heat amount Qb in the first embodiment is greater than the cold heat amount Qa in a structure in which hydrogen is supplied to the expander 42 without being heated as in the comparative example (i.e., in a structure such as that of the comparative example). Therefore, in the first embodiment, the cooling effect of the cooling liquid by the hydrogen that flows from the expander 42 can be improved as compared with a structure such as that of the comparative example.

Moreover, from above formula 2 and formula 6, the temperature T13 of the hydrogen H13 that flows from the discharge port of the expander 42 to the second supply port 52 of the second heat exchanger 32 in the first embodiment, is higher than temperature T23 of the hydrogen H23 that flows from the discharge port of the expander 42 to the second supply port 52 of the second heat exchanger 32 in the comparative example. Therefore, in the first embodiment, as compared with the comparative example, the difference between the temperature (air temperature) of the portion between the discharge port of the expander 42 and the second supply port 52 of the second heat exchanger 32, and the temperature T13 of the hydrogen H13 that flows between the discharge port of the expander 42 and the second supply port 52 of the second heat exchanger 32, can be made to be small. Due thereto, absorption of heat from the exterior by the hydrogen H13, while the hydrogen H13 flows from the discharge port of the expander 42 to the second supply port 52 of the second heat exchanger 32, can be suppressed.

Further, in the first embodiment, due to heat being exchanged between the cooling liquid W, which has become high-temperature due to the heat exchange at the fuel cell stack 12, and the hydrogen H11, which is normal-temperature and high-pressure and has been released from the tank 18 and flowed through the gate valve 20, the first pressure-adjusting valve 26 and the first discharge port of the switching valve 30, the hydrogen H11 is heated and becomes the high-temperature, high-pressure hydrogen H12. (Namely, the heat source for heating the hydrogen H11 is the cooling liquid W that has become high-temperature due to the heat exchange at the fuel cell stack 12.) Therefore, a special heat source that is separate from the cooling liquid W and that is for heating the hydrogen H11, and a heating device such as a heater or the like for heating the hydrogen H11 by such a special heat source, are not needed. Due thereto, the structure of the fuel cell system 10 can be made to be simple and compact, and a lowering of the cost thereof can be realized.

Second Embodiment

A second embodiment is described next.

Figure 3:
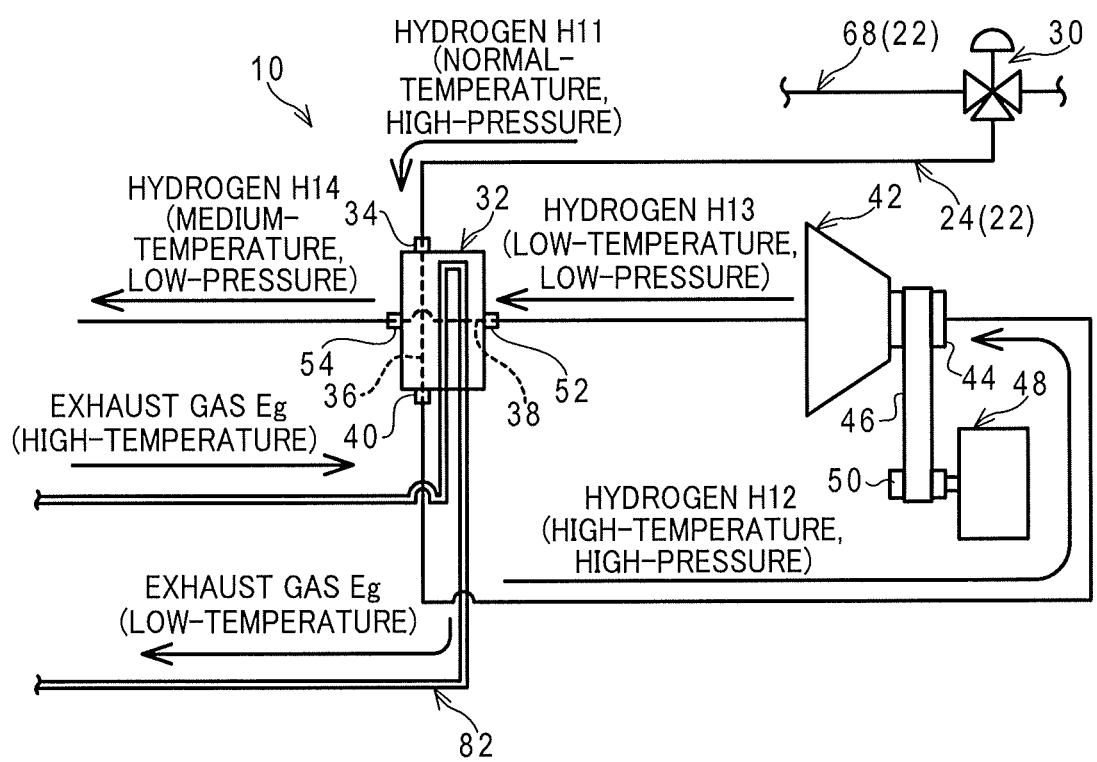
FIG. 3 is a circuit diagram of hydrogen, cooling liquid and the like, that shows main portions of the structure of a fuel cell system of a second embodiment.

As shown in FIG. 3, in the present embodiment, the cooling liquid flow path 14 is not provided at the second heat exchanger 32, and, instead, an exhaust gas flow path 82 is provided. One end of the exhaust gas flow path 82 is connected to the discharge port at the negative electrode side of the fuel cell stack 12. Exhaust gas Eg, which is air that serves as the oxidant gas and that is used in the electrochemical reaction with hydrogen that serves as the fuel gas, is discharged from the discharge port at the negative electrode side of the fuel cell stack 12 and flows to the exhaust gas flow path 82. Here, when the electrochemical reaction between the hydrogen and the oxygen of the air occurs at the fuel cell stack 12, the exhaust gas Eg that is air and that is generated by the electrochemical reaction becomes high-temperature. On the other hand, the portion, which is further toward the other end side than the second heat exchanger 32, of the exhaust gas flow path 82 passes through the fuel cell stack 12.

In such a structure, the hydrogen H11, which is normal-temperature and high-pressure and is released from the tank 18 and flows, via the gate valve 20 and the first pressure-adjusting valve 26, through the first discharge port of the switching valve 30, flows from the first supply port 34 of the second heat exchanger 32 to the first heat exchanger flow path 36. Due thereto, heat is exchanged between the normal-temperature, high-pressure hydrogen H11 and the high-temperature exhaust gas Eg. Due thereto, the hydrogen H11 is heated and becomes high-temperature, high-pressure hydrogen H12, and this high-temperature, high-pressure hydrogen H12 is supplied to the expander 42.

On the other hand, due to the high-temperature, high-pressure hydrogen H12 being adiabatically expanded at the expander 42, the hydrogen H12 becomes the low-temperature, low-pressure hydrogen H13 and flows from the second supply port 52 of the second heat exchanger 32 to the second heat exchanger flow path 38. The low-temperature, low-pressure hydrogen H13 flows through the second heat exchanger flow path 38 of the second heat exchanger 32. Due thereto, heat is exchanged between the low-temperature, low-pressure hydrogen H13 and the high-temperature exhaust gas Eg. The exhaust gas Eg is thereby cooled.

The exhaust gas Eg that has been cooled in this way flows to the fuel cell stack 12 side, and warms the fuel cell stack 12. Due thereto, the generation of heat of the fuel cell stack 12 can be promoted, and, for example, freezing of water generated by the electrochemical reaction between the hydrogen and the oxygen at the cells of the fuel cell stack 12 can be suppressed, or ice that has formed due to this water freezing can be melted.

Further, in the above-described first embodiment, the fluid, which exchanges heat with the hydrogen that serves as a fuel gas by passing through the second heat exchanger 32, is the cooling liquid, whereas, in the present embodiment, the fluid is the exhaust gas Eg. Therefore, effects that are similar to the effects of the above-described first embodiment, other than the unique effects that are due to the fluid being a cooling liquid, such as the improvement in the cooling effect of the cooling liquid by the hydrogen that flows from the expander 42, and the like, can be obtained in the present embodiment as well.

Note that, in the present embodiment, there is a structure in which the exhaust gas Eg warms the fuel cell stack 12 due to the exhaust gas Eg flowing to the fuel cell stack 12 side. However, for example, there may be a structure in which the exhaust gas Eg indirectly warms the fuel cell stack 12 due to the exhaust gas Eg warming a coolant or the like such as a cooling liquid or the like that some of which is provided at the fuel cell stack 12 and that can cool the fuel cell stack 12.

Moreover, in the present embodiment, there is a structure in which the exhaust gas Eg warms the fuel cell stack 12. However, there may be a structure in which the other end side of the exhaust gas flow path 82 is disposed at an air conditioner for adjusting the temperature and the like of the vehicle cabin interior, and heat exchange is caused between the exhaust gas Eg and the air that flows through the ducts or the like of the air conditioner, and, due thereto, the air that flows through the ducts or the like of the air conditioner is warmed. Further, although the present embodiment is structured such that the exhaust gas Eg warms the fuel cell stack 12, there may be a structure in which the exhaust gas Eg is merely exhausted to the exterior of the vehicle.

Moreover, in the present embodiment, there is a structure in which the exhaust gas flow path 82 is provided at the second heat exchanger 32. However, there may be a structure in which a supply gas flow path, which is connected to the supply port at the negative electrode side of the fuel cell stack 12 and through which air that serves as the oxidant gas flows to the fuel cell stack 12, is provided at the second heat exchanger 32. An example in which, in such a structure, further, air that serves as the oxidant gas is compressed and flows to the fuel cell stack 12, is described briefly hereinafter as a modified example of the second embodiment.

In this modified example, the air that serves as the oxidant gas become compressed air that is compressed by a gas compressing device such as a compressor or the like. The compressed air flows through the supply gas flow path, and flows to the supply port at the negative electrode side of the fuel cell stack 12. Due thereto, the pressure environment within the fuel cell stack 12 is maintained higher than atmospheric pressure. Within the fuel cell stack 12, the hydrogen that has been supplied into the fuel cell stack 12 is ionized by a catalyst, and becomes protons (hydrogen ions). The hydrogen ions are transmitted toward the negative electrode side, and water is used as the medium for transmitting the hydrogen ions to the negative electrode side.

When the electrochemical reaction between hydrogen and oxygen occurs at the fuel cell stack 12, accompanying this, reaction heat is generated, and the interior of the fuel cell stack 12 becomes a high-temperature environment. Here, as described above, due to air being compressed and being supplied to the fuel cell stack 12, the water, which serves as the medium for transmitting hydrogen ions to the negative electrode side, can be supplied stably.

In this modified example, as described above, the supply gas flow path, which is the flow path of the compressed air that flows to the fuel cell stack 12 side, is provided at the second heat exchanger 32. The temperature of the air is raised due to the air being compressed. Accordingly, at the second heat exchanger 32, the compressed air is cooled, and the hydrogen is heated. In this way, due to the compressed air being cooled, the concentration of air can be made to be high, and the air intake efficiency at the supply port at the negative electrode side of the fuel cell stack 12 can be made to be high.

Moreover, in a structure in which air that serves as the oxidant gas is compressed and is supplied to the supply port at the negative electrode side of the fuel cell stack 12, there are also structures in which, separately from the heat exchanger 32, the air is cooled by an air cooling means such as cooling water or the like. Even in such a structure that has an air cooling means, due to the air being cooled further by the second heat exchanger, the concentration of the air can be made to be even higher, and the air intake efficiency at the supply port at the negative electrode side of the fuel cell stack 12 can be made to be even higher. Moreover, a decrease in the burden on the air cooling means also becomes possible.

Third Embodiment

A third embodiment is described next.

Figure 4:
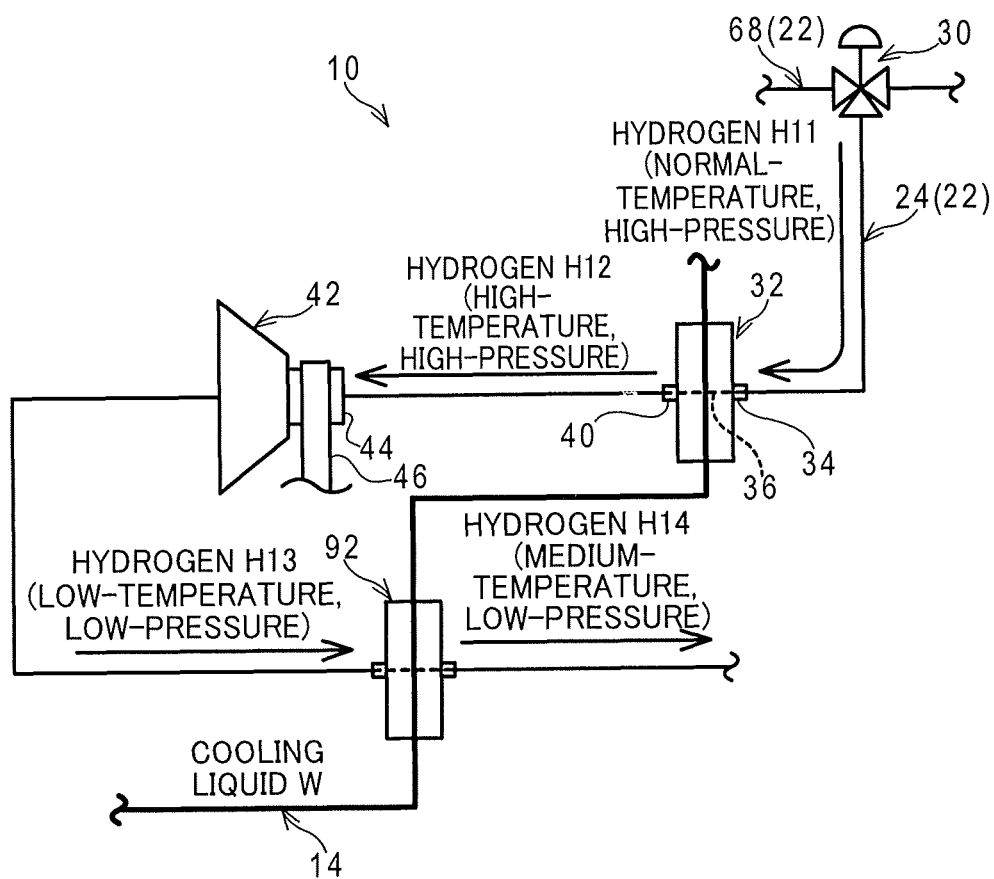
FIG. 4 is a circuit diagram of hydrogen, cooling liquid and the like, that shows main portions of the structure of a fuel cell system of a third embodiment.

As shown in FIG. 4, in the present embodiment, the second heat exchanger 32 is disposed on the main flow path 24, between the switching valve 30 and the expander 42 (i.e., at the upstream side of the expander 42). In the present embodiment, at further toward the downstream side than the expander 42, the main flow path 24 is not connected to the second heat exchanger 32. Further, in the present embodiment, a third heat exchanger 92 is provided. The third heat exchanger 92 is disposed between the expander 42 and the first injector 56 (i.e., is disposed at the downstream side of the expander 42), and the discharge port of the expander 42 is connected by the main flow path 24 to the supply port of the third heat exchanger 92. The cooling liquid flow path 14 is provided at the second heat exchanger 32 and the third heat exchanger 92. The cooling liquid W, which has flowed through one of the second heat exchanger 32 and the third heat exchanger 92, flows to the other of the second heat exchanger 32 and the third heat exchanger 92.

In the present embodiment that is structured as described above, due to the normal-temperature, high-pressure hydrogen H11, which has been released from the tank 18, flowing through the second heat exchanger 32, heat exchange is carried out between the hydrogen H11 and the cooling liquid W. Due thereto, the heated hydrogen H11 becomes high-temperature, high-pressure hydrogen H12, and flows to the expander 42. Further, due to the low-temperature, low-pressure hydrogen H13, which is discharged-out from the expander 42, flowing through the third heat exchanger 92, heat exchange is carried out between the hydrogen H13 and the cooling liquid W. Due thereto, the cooling liquid W is cooled.

Even with such a structure, the present embodiment can obtain effects that are similar to those of the above-described first embodiment.

Note that, in the present embodiment, there is a structure in which the cooling liquid W that serves as a fluid flows through both the second heat exchanger 32 and the third heat exchanger 92. However, the fluid that flows through the second heat exchanger 32 and the third heat exchanger 92 may be the exhaust gas Eg. Further, there may be a structure in which different fluids flow through the second heat exchanger 32 and the third heat exchanger 92, such as a structure in which the cooling liquid W flows through one of the second heat exchanger 32 and the third heat exchanger 92, and the exhaust gas Eg flows through the other of the second heat exchanger 32 and the third heat exchanger 92, and the forms of the fluids are not particularly limited.

Moreover, the present embodiment is structured to have the second heat exchanger 32 and the third heat exchanger 92. However, the structure for heating the hydrogen which serves as the fuel gas before flowing to the expander 42 is the second heat exchanger 32 in the present embodiment. Accordingly, there may be a structure in which only the second heat exchanger 32 is provided, and the third heat exchanger 92 is not provided.

Further, the above-described respective embodiments are structured such that the heating device is the second heat exchanger 32. However, the heating device may be, for example, a heater or the like that indirectly heats the hydrogen that serves as the fuel gas, by heating the main flow path 24 at further toward the upstream side than the expander 42. Namely, provided that the heating device is a structure that can heat the hydrogen that serves as the fuel gas before the hydrogen flows to the expander 42, the heating device is not limited to a specific form.

Moreover, the above-described respective embodiments are structured such that the fuel gas flow path 22 has the bypass flow path 68 in addition to the main flow path 24. However, the fuel gas flow path 22 may be structured by only the main flow path 24, without providing the bypass flow path 68.

An object of the present disclosure is to provide a fuel cell system that can increase the mechanical energy that is obtained by reducing the pressure of a fuel gas in an expander.

A fuel cell system of a first aspect of the present disclosure includes: a fuel cell stack of fuel cells that generate electricity by electrochemical reaction between hydrogen that is a fuel gas and oxygen that is an oxidant gas; an expander that is provided on a supply path of the fuel gas to the fuel cell stack, and at which, due to the fuel gas that is in a high-pressure state being supplied thereto, the fuel gas is expanded and the pressure thereof is reduced, and, due to the fuel gas being expanded and the pressure thereof being reduced, internal energy of the fuel gas is converted into mechanical energy; and a heating device that is provided further toward an upstream side of the supply path than the expander, and that heats the fuel gas.

In accordance with the fuel cell system of the first aspect of the present disclosure, the fuel gas that has been heated by the heating device is sent to the expander. Due thereto, the temperature of the fuel gas, which is sent to the expander, rises, and the internal energy of the fuel gas increases.

Therefore, the mechanical energy that is obtained by the reducing of the pressure of the fuel gas at the expander increases.

A fuel cell system of a second aspect of the present disclosure is the fuel cell system of the first aspect, wherein the heating device is a heat exchanger through which a fluid that has a higher temperature than a temperature of the fuel gas flows, and that causes heat to be exchanged between the fuel gas and the fluid that is in a high-temperature state, and heats the fuel gas.

In accordance with the fuel cell system of the second aspect of the present disclosure, the fuel gas flows through the heat exchanger that serves as the heating device. Fluid, which has a higher temperature than the fuel gas that is further toward the upstream side of the supply path than the heat exchanger, flows through the heat exchanger, and, at the heat exchanger, heat is exchanged between the fluid that is in a high-temperature state and the fuel gas. Due thereto, the temperature of the fuel gas increases.

A fuel cell system of a third aspect of the present disclosure is the fuel cell system of the second aspect, wherein a fluid, which has been set in a high-temperature state by having cooled an object of cooling, flows through the heat exchanger.

In accordance with the fuel cell system of the third aspect of the present disclosure, fluid, which has cooled an object of cooling and has become a high-temperature state, flows through the heat exchanger, and, at the heat exchanger, heat is exchanged between this fluid that is in a high-temperature state and the fuel gas. Due thereto, the fluid, which has cooled the object of cooling and has become a high-temperature state, can be cooled.

A fuel cell system of a fourth aspect of the present disclosure is the fuel cell system of the second or third aspect, wherein the heat exchanger includes: a first heat exchanger flow path that is provided further toward an upstream side of the supply path than the expander, and at which heat can be exchanged between the fuel gas and the fluid due to the fuel gas flowing through the first heat exchanger flow path; and a second heat exchanger flow path that is provided further toward a downstream side of the supply path than the expander, and at which heat can be exchanged between the fuel gas and the fluid due to the fuel gas flowing through the second heat exchanger flow path.

In accordance with the fuel cell system of the fourth aspect of the present disclosure, heat exchange between the fuel gas and the fluid is made possible due to the fuel gas flowing through the first heat exchanger flow path of the heat exchanger. The temperature of the fuel gas rises due to the heat exchange between the fuel gas and the fluid at the first heat exchanger flow path.

On the other hand, when the pressure of the fuel gas is reduced and the fuel gas is expanded at the expander, and the internal energy of the fuel gas is converted into mechanical energy, the temperature of the fuel gas falls. The fuel gas, which has become a low-temperature, low-pressure state in this way, flows through the second heat exchanger flow path of the heat exchanger that is provided further toward the downstream side of the supply path than the expander. Due to the fuel gas flowing through the second heat exchanger flow path of the heat exchanger, heat exchange between the fuel gas and the fluid is made possible. The fluid can be effectively cooled by the heat exchange between the fuel gas and the fluid at the second heat exchanger flow path.

A fuel cell system of a fifth aspect of the present disclosure is the fuel cell system of any one of the first through fourth aspects, wherein the heating device heats the fuel gas by a cooling liquid that serves as a fluid and that has been made to have a higher temperature than the fuel gas, which is further toward the upstream side of the supply path than the heating device, due to the fluid having cooled the fuel cell stack.

In accordance with the fuel cell system of the fifth aspect of the present disclosure, the fuel gas that is sent to the expander is heated at the heating device by the fluid which has become higher temperature than the fuel gas that is further toward the upstream side of the supply path than the heating device. Here, the fluid that heats the fuel gas is the cooling liquid that cools the fuel cell stack. Therefore, the heat of the fuel cell stack can be made to be a substantial heat source for heating the fuel gas, and a special heat source is not needed.

A fuel cell system of a sixth aspect of the present disclosure is the fuel cell system of any one of the first through fourth aspects, wherein the heating device heats the fuel gas by exhaust gas that is the oxidant gas, that serves as a fluid and that has been made to have a higher temperature than the fuel gas, which is further toward the upstream side of the supply path than the heating device, due to the exhaust gas having been used in generating electricity at the fuel cell stack.

In accordance with the fuel cell system of the sixth aspect of the present disclosure, the fuel gas that is sent to the expander is heated at the heating device by the fluid that has become higher temperature than the fuel gas that is further toward the upstream side of the supply path than the heating device. Here, the fluid that heats the fuel gas is the exhaust gas that is the oxidant gas that is used in generating electricity at the fuel cell stack. Therefore, the heat of the fuel cell stack can be made to be a substantial heat source for heating the fuel gas, and a special heat source is not needed.

As described above, in the fuel cell system of the first aspect of the present disclosure, the mechanical energy that is obtained by the reduction in pressure of the fuel gas at the expander can be increased.

In the fuel cell system of the second aspect of the present disclosure, heat is exchanged between the fluid that is in a high-temperature state and the fuel gas. Due thereto, the temperature of the fuel gas can be increased, and the mechanical energy that is obtained by the reducing of the pressure of the fuel gas at the expander can be increased.

In the fuel cell system of the third aspect of the present disclosure, the temperature of the fuel gas can be increased, and the mechanical energy that is obtained by the reducing of the pressure of the fuel gas at the expander can be increased, and the fluid, which has cooled the object of cooling and has become a high-temperature state, can be cooled.

In the fuel cell system of the fourth aspect of the present disclosure, the temperature of the fuel gas can be increased due to the fuel gas flowing through the first heat exchanger flow path of the heat exchanger. Moreover, the fluid can be effectively cooled due to the fuel gas, whose pressure has been reduced and that has been expanded and whose temperature has been lowered at the expander, flowing through the second heat exchanger flow path of the heat exchanger.

In the fuel cell systems of the fifth aspect and the sixth aspect of the present disclosure, the heat of the fuel cell stack can be made to be a substantial heat source for heating the fuel gas, and a special heat source is not needed.

What is claimed is:

1. A fuel cell system comprising:
a fuel cell stack of fuel cells that generate electricity by electrochemical reaction between hydrogen that is a fuel gas and oxygen that is an oxidant gas;
an expander that is provided on a supply path of the fuel gas to the fuel cell stack, and at which, due to the fuel gas that is in a high-pressure state being supplied thereto, the fuel gas is expanded and the pressure thereof is reduced, and, due to the fuel gas being expanded and the pressure thereof being reduced, internal energy of the fuel gas is converted into mechanical energy; and
a heating device that is provided further toward an upstream side of the supply path than the expander, and that heats the fuel gas, wherein:
the heating device is a heat exchanger through which a fluid that has a higher temperature than a temperature of the fuel gas flows, and that causes heat to be exchanged between the fuel gas and the fluid that is in a high-temperature state, and heats the fuel gas, and
the heat exchanger includes:
a first heat exchanger flow path that is provided further toward an upstream side of the supply path than the expander, and at which heat can be exchanged between the fuel gas and the fluid due to the fuel gas flowing through the first heat exchanger flow path; and
a second heat exchanger flow path that is provided further toward a downstream side of the supply path than the expander, and at which heat can be exchanged between the fuel gas and the fluid due to the fuel gas flowing through the second heat exchanger flow path.

2. The fuel cell system of claim 1, wherein the fluid, which has been set in a high-temperature state by having cooled an object of cooling, flows through the heat exchanger.

3. The fuel cell system of claim 1, wherein the heating device heats the fuel gas by a cooling liquid that serves as the fluid and that has been made to have a higher temperature than the fuel gas, which is further toward the upstream side of the supply path than the heating device, due to the fluid having cooled the fuel cell stack.

4. The fuel cell system of claim 1, wherein the heating device heats the fuel gas by exhaust gas that is the oxidant gas, that serves as the fluid and that has been made to have a higher temperature than the fuel gas, which is further toward the upstream side of the supply path than the heating device, due to the exhaust gas having been used in generating electricity at the fuel cell stack.

5. The fuel cell system of claim 1, wherein the heating device is a heater that indirectly heats the fuel gas by heating further toward the upstream side of the supply path than the expander.

* * * * *